April 12, 1949.  R. K. BIERY  2,466,836
AIR BRAKE RESERVOIR BLEED MEANS
Filed April 27, 1946  4 Sheets-Sheet 1
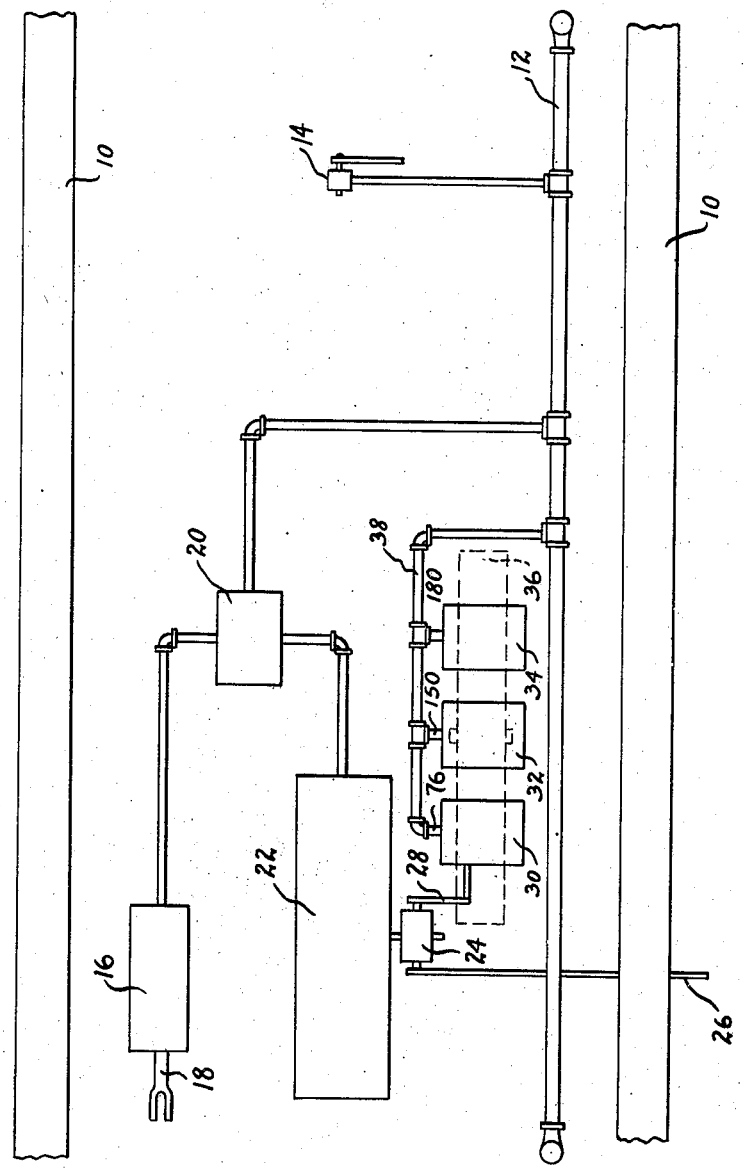
Inventor
Robert K. Biery
By Clarence A. O'Brien
and Harvey B. Jacobson
Attorneys April 12, 1949. R. K. BIERY 2,466,836
AIR BRAKE RESERVOIR BLEED MEANS
Filed April 27, 1946 4 Sheets-Sheet 2
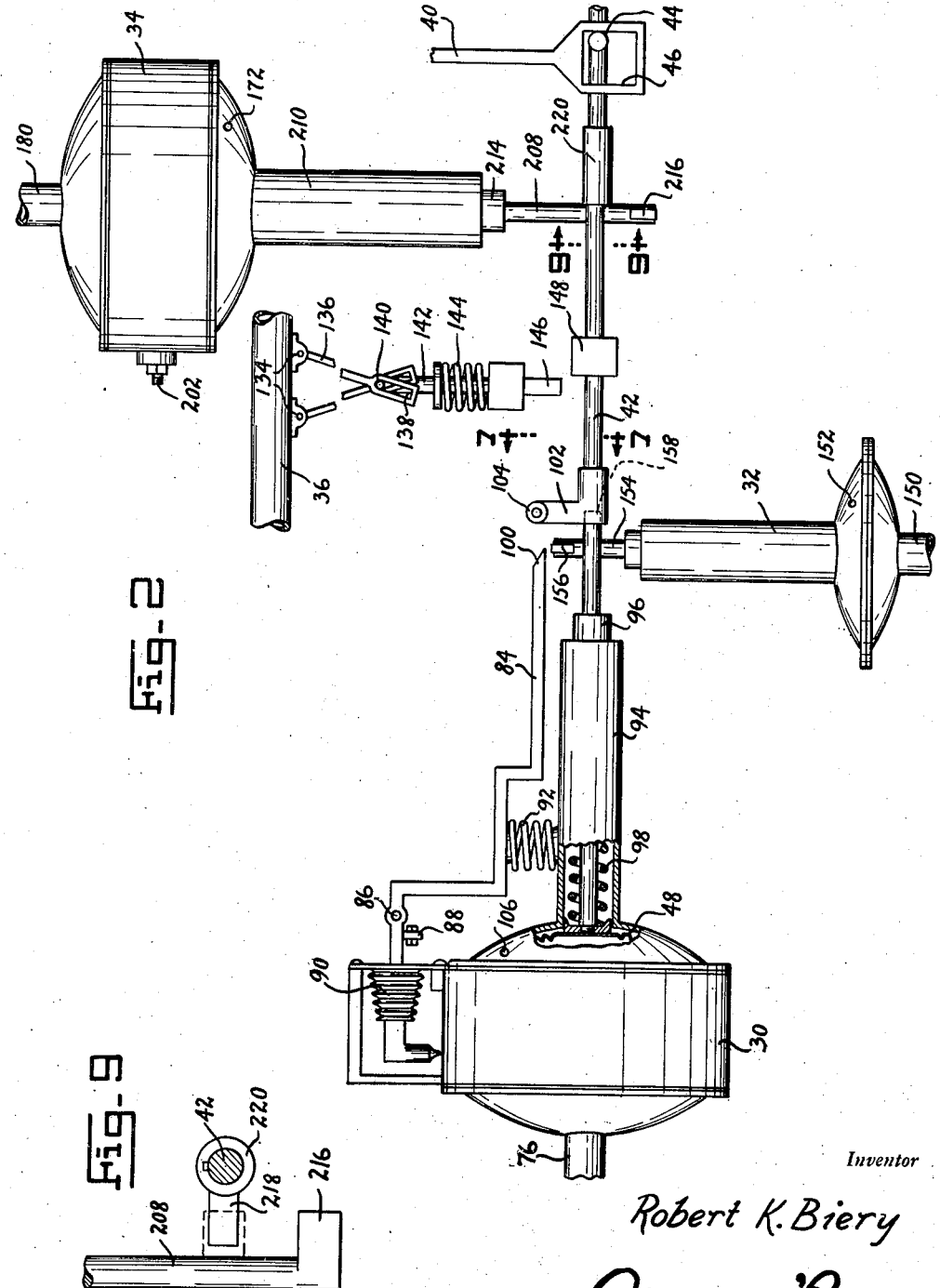
Inventor
Robert K. Biery
By Clarence A. O'Brien
and Harvey B. Jacobson
Attorneys

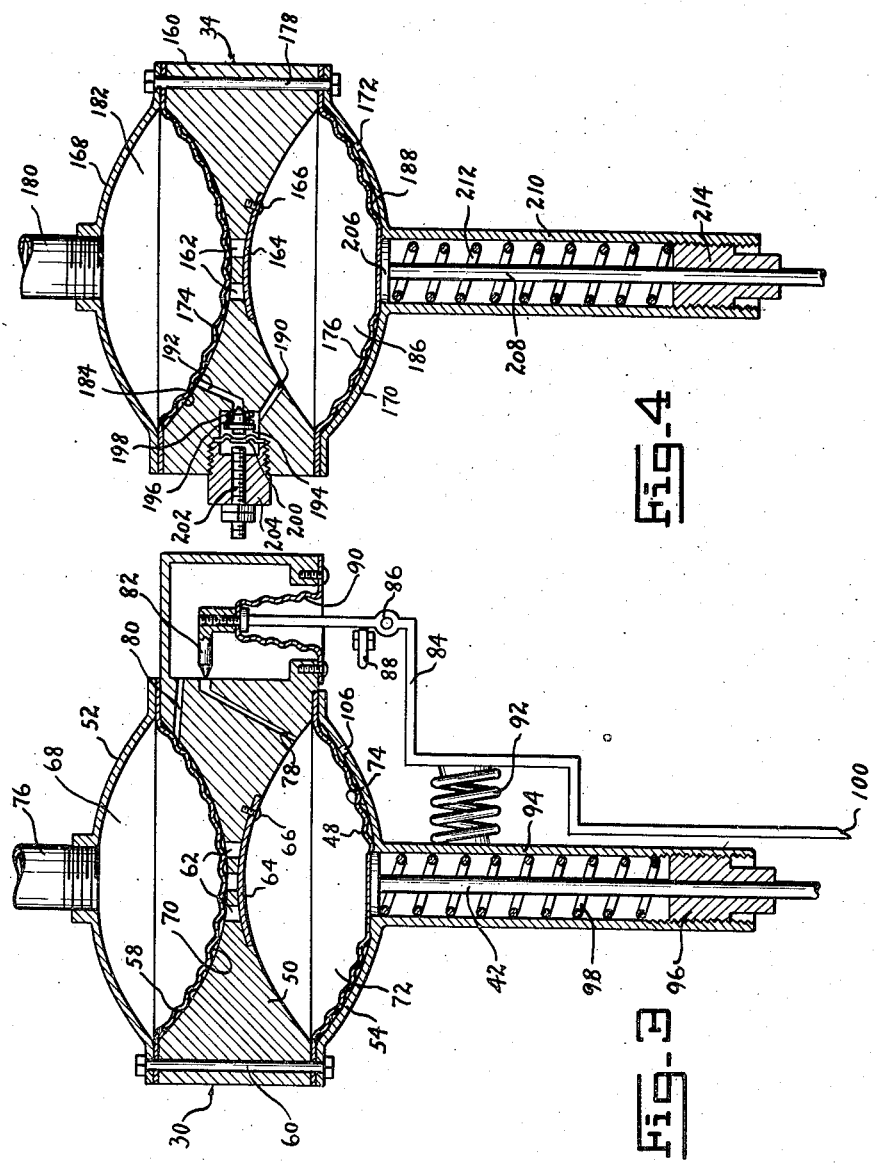

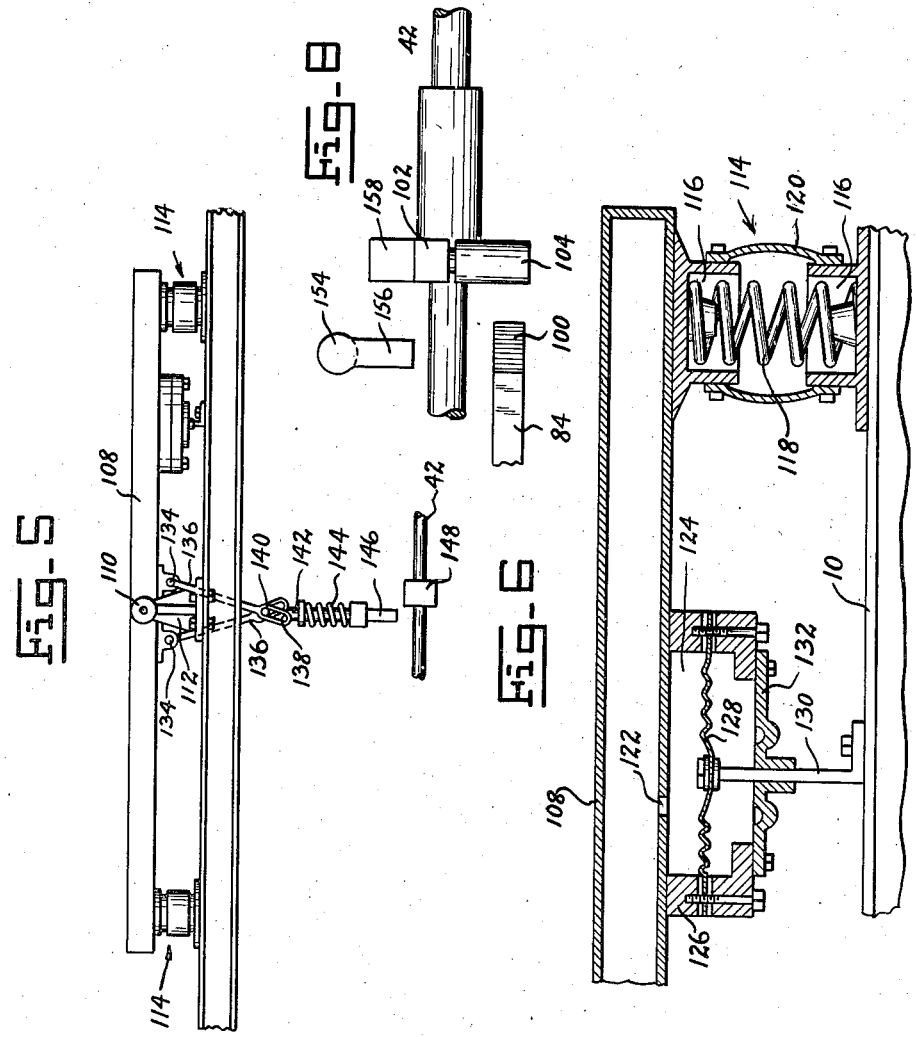

Patented Apr. 12, 1949

2,466,836

UNITED STATES PATENT OFFICE 2,466,836

AIR BRAKE RESERVOIR BLEED MEANS

Robert K. Biery, New Orleans, La.

Application April 27, 1946, Serial No. 665,514

20 Claims. (Cl. 303—80)

1

This invention relates to an air brake system and comprises an improvement over, and a continuation in part of my co-pending application Serial No. 596,897 filed May 31, 1945.

In said co-pending application, is disclosed a mechanism whereby automatic bleeding or exhausting of the individual car reservoirs of a conventional air brake system for railways could be effected, together with safety means for preventing undesired evacuation of said reservoirs under certain detrimental conditions. The present application relates to an improved mechanism and manner for effecting the functions of said prior application and includes additional safety devices preventing operating of the reservoir bleeding means under various predetermined conditions of the brake mechanism.

In general, this invention constitutes an automatic means for bleeding the car reservoirs by prolonged diminution of the train line pressure below the normal service brake operating range by the locomotive engineer, together with means to prevent inadvertent or unintentional bleeding of the car reservoirs. The objects of this invention are to provide a device of the character described above wherein the car reservoirs of a train may be bled by the engineer from the locomotive cab and by manipulation of the conventional brake actuating mechanism carried by any car in a train.

Additional objects of the invention are the provision of various safety devices which will prevent operation of the automatic bleeding means when the car is upon an incline exceeding a predetermined gradient, or when the conventional service brakes of the train are being applied, or when an emergency brake application is being made, or when a slow leak develops when the brakes have been set upon cars standing on a siding.

These together with numerous other objects of the invention, which will later become apparent as the following description proceeds, are attained by my invention, one embodiment of which has been illustrated by way of example in the accompanying drawings, wherein:

Figure 1 is a diagrammatic sketch in top plan view, showing the arrangement of parts of my invention upon the frame of a conventional railway car;

Figure 2 is a diagrammatic elevation, partly in section, illustrating a portion of the automatic controls forming a part of the invention;

Figure 3 is a central sectional elevation through the primary actuating member;

2

Figure 4 is a view similar to Figure 3 of the slow leak timer;

Figure 5 is a side elevation of the inclination responsive safety device;

Figure 6 is a detail in central vertical section through the device of Figure 5;

Figure 7 is a detail in vertical section being taken substantially upon the line 7—7 of Figure 2;

Figure 8 is a top plan view of the details shown in Figure 7; and,

Figure 9 is a vertical sectional view of a detail, taken substantially upon the line 9—9 of Figure 2.

For a general explanation of the environment to which my invention is applied, attention is first directed to Figure 1, wherein will be seen the conventional frame side members 10 of a railway car to which are secured in suitable and known manner the usual elements of an automatic air brake system. These elements include the train brake line or brake pipe 12, the conductor's or emergency brake valve 14, the brake actuating cylinder 16 having a brake actuating rod 18, the triple valve 20 and the individual car reservoir 22. The foregoing elements are all well known in the automatic air brake field, form no part of this invention and need no further description.

The conventional system also includes a bleed valve for exhausting the individual car reservoir and a manual means for operating said bleed valve. In my invention, I provide a bleed valve 24 and a manual operating means 26 therefor, of generally conventional construction, but I also provide an actuating means indicated generally at 28 and the various automatic operating instrumentalities indicated generally at 30, 32, 34, 36, the three former constituting fluid pressure responsive actuators, connected to a branch 38 of the brake pipe or train line 12. It will be here noted that actuators 30, 32, 34 are adapted to perform their functions in timed relation to each other in response to changes of predetermined amount and duration in pressure of the train line, as set forth hereinafter.

Attention is now directed to Figure 2 wherein the general operative association of the elements of my invention is more clearly disclosed. At 40 I have shown a portion of an operating lever which is suitably connected for actuation of the means 28, whereby the bleed valve 24 can be manipulated automatically in accordance with the dictates of this invention. A longitudinally reciprocable shaft 42 is operatively associated adjacent one end with the lever 40, by means of a pintle or roller thereon 44, loosely engaged in the aperture 46 of predetermined proportions, to be set forth hereinafter. At its other end, the shaft 42 is secured to the diaphragm 48 of the primary actuating member 30, to be now described.

As best shown in Figure 3, a cylindrical base member 50 concaved upon both sides has arcuate cover plates 52, 54, and metallic diaphragm elements 58, 48 respectively secured as by bolts 60 upon opposite sides thereof. A series of ports 62, and resilient metallic valve member 64 secured as at 66, provides one-way communication through the base member, which with the metallic diaphragms and the cover plates, forms four expansible chambers 68, 70, 72 and 74. Chamber 68 communicates through the pipe 76 and the conduit 38 with the train brake pipe 12 and is therefore at all times subject to the train line pressure. Free communication from chamber 70 to 72 is permitted by the ports 62, the flap valve 64 preventing reverse flow. Controllable reverse flow, from chamber 72 to chamber 70 is however provided by means of conduits 78, 80 and the needle valve 82, carried by the angularly bent lever 84, pivoted to the stationary fulcrum 86. As shown at 88, an adjustable stop means limits closing movement of the needle valve and its restriction of the flow through passages 78, 80, suitable flexible sealing means 90 cooperating with an enclosing housing serving to seal the passages 78, 80 from communication with the atmosphere. A spring 92 is disposed between a portion of the lever 84 and an axially extending boss 94 of the cover plate 54 to yieldingly bias the needle valve 82 towards its closing position as limited by the stop 88. The boss 94 is centrally bored and provided with an adjustable, screw threaded closure plug 96, apertured to slidably and guidingly receive the shaft 42 which is attached to and moves with the diaphragm 48, a spring 98, adjustable by plug 96, urging the shaft 42 towards the member 30. The lever 84 is provided with a terminal portion parallel to and adjacent shaft 42 comprising a cam surface 100, for a purpose to be disclosed later.

The operation of member 30 is as follows. A fluid medium is sealed between diaphragms 58 and 48, in the chambers 70, 72, passages 78, 80 and the chamber containing the needle valve 82. When the chamber 68 is exposed to a train line pressure above the force exerted by spring 98, the diaphragm 58 is moved into contact with the concaved surface of member 50, forcing the fluid in chamber 70 through the ports 62 and past the valve 64 into chamber 72, driving the diaphragm 48 thereof and the attached shaft 42 outwardly from the member 50, and to its full outward position. This position is shown in Figure 3 and represents the normal position of the device when the train air brakes are released and the normal brake line pressure prevails in the system. In this position of the rod 42, see Figure 2, the roller 44 engages the right side of slot 46 and urges the lever 40 in a counter-clockwise direction, thereby maintaining the reservoir bleed valve 24 in its closed position.

The spring 98 is normally loaded by plug 96 at a pressure below the normal pressure range in which the brakes are applied when the train line pressure is reduced, either suddenly or gradually the chamber 68 and diaphragm 58 and the chamber 72 and diaphragm 48 connected by passages 62 are no longer able to maintain the spring 98 compressed. Consequently, the diaphragm 58 and with it the rod 42 begin to move inwardly of the boss 94 of the member 30. Immediately, the valve 64 seats and the air or fluid in chamber 72 is now bled through the passages 78 and 80, and past the valve 82 into chamber 70. This flow is restricted to a predetermined rate by the adjustable setting of stop 88, and the rod 42 therefor travels slowly to the left with a predetermined rate of travel. A vent 106, Figure 2, relieves the chamber 74 from any dash pot effect of trapped air behind the diaphragm 48.

Longitudinally adjustable upon the shaft 42 in any suitable manner is an arm 102 provided with a laterally extending roller 104, so positioned that after a predetermined travel equal to one-half the width of slot 46, the roller 104 will engage cam surface 100 and depress lever 84, thus fully opening the needle valve 82 and permitting more rapid escape of fluid from chamber 72 to 70 and more rapid movement of rod 42. When the predetermined lost motion of pin 44 in slot 46 is taken up, further movement of rod 42 rotates lever 40 opening valve 24 and bleeding the reservoirs 22 on the associated railway car. The width of slot 46 therefore constitutes a lost motion for shaft 42, and no actuation of the bleed valve can be effected until this play is taken up. It will be understood that this action occurs simultaneously upon each car of the train, whereby each car may be freed of its brakes by the locomotive engineer by proper manipulation of the air valve throttle, for shifting on sidings, and the like.

It will be evident that the foregoing device will not function satisfactorily in itself, since it would bleed the cylinders every time the brake line pressure was lowered below its normal operating range by either a fast leak as for an emergency stop or by a slow leak as by the service application of brakes or a leak in the line when cars are left standing. Moreover, if the cars to be detached from the train were bled and left standing on an incline, they would obviously tend to run away. Accordingly, I have provided various safety devices preventing the full operating movement of the rod 42 in its actuating stroke under certain conditions of operation, such as the foregoing, known to be undesirable for bleeding the car reservoirs. It is to give these various safety devices time in which to act, that the lost motion at 46 is provided.

Among these instrumentalities for rendering the bleeding means inoperative even though the train line pressure is reduced below the abovementioned predetermined value, is the inclination responsive means indicated generally at 36 in Figures 1 and 2 and more in detail in Figures 5 and 6. The function of this mechanism is to prevent bleeding the reservoirs and thereby rendering the car brakes inoperative, when the car is on an incline exceeding a predetermined safe value. The structure and operation of this inclination responsive means is shown, and described and claimed in my copending application and is not claimed per se in this application. Briefly, it consists of a shallow flat tank 108 pivoted at its mid-point by trunnions 110, extending laterally of the tank and of the car, journaled in suitable supports 112 secured to the car frame member 10, and disposed in juxtaposition to the sliding shaft 42. At each end of the tank spring means indicated generally at 114 urge the tank to a position parallel to the car frame member 10. As shown in Figure 6, the spring means consist of aligned cup shaped brackets 116 secured to tank 108 and member 10 and seating therein a coil spring 118, an enclosing hood 120 being provided to protect the parts from dirt or damage and in some instances constituting an oil casing or a dash pot for assisting the action of the springs. The tank is partially filled with oil or other liquid to any desired level, and is equipped with a restricted orifice 122 at its lower surface. The bleed orifice 122 opens into a chamber 124 formed between the bottom of tank 108, enclosing walls 126 and a metallic diaphragm 128, the latter being centrally secured upon a support 130 arising from frame 10. A lower cover plate 132 houses the lower diaphragm and is slidingly and vertically disposed upon the stationary support rod 130. When the car and frame 10 are on an incline exceeding a predetermined gradient, the fluid in the tank 108 moves to the lower end of the tank, turning the latter about its trunnions 110 and causing a further displacement of fluid to the lower side, the now unbalanced tank depressing the corresponding spring element 114. This shifting movement is retarded by the fluid dash pot 122, 124, since fluid must flow from chamber 124 and through the orifice 122 into the tank in order for the latter to drop down upon the stationary rod 130 and the collapsing chamber 124. Conversely, fluid is drawn into the expanding chamber 124 when the tank is elevated at the dash pot. The dash pot thereby prevents oscillation of the tank 108 about trunnions 110 in response to temporary inclination, but permits such movement when a sustained period of inclination occurs.

Upon opposite sides of the trunnion 110 are pivoted as at 134 a pair of links 136 whose other ends are apertured as by elongated openings 138 and each slidingly embraces a transverse pin 140 secured in the upper end of a vertically slidable rod 142, guided in any suitable manner. A spring 144 yieldingly biases the rod into upward position. A depending lug 146 on the lower end of the rod 142, in response to descension thereof, is disposed in the path of travel of a stop 148 secured to the sliding shaft 42, to prevent movement of the shaft to the left. Regardless of the direction of rotation of tank 108 about the trunnions 110, one of the links 136 will lower the lug 146 in front of the stop and thereby block the bleeding of the reservoir by completion of the travel inward of the shaft 42, lever 40 and arm 28.

It will be obvious that I may so position the stop 148 that lug 146 will block the same at any predetermined time or place in the travel of shaft 42 after its initial movement to the left but before lever 40 has been shifted to the bleed position. Consequently, when a car stands on an unsafe incline, the mechanism 36 prevents the bleeding of its reservoir.

Allusion is now made to the fast leak timer 32 as shown generally in Figures 1 and 2. A conduit 150 transmits train line pressure from the pipe 38 to the lower side of a diaphragm which is spring urged downwardly, the construction being conventional and is therefor not shown. The diaphragm, subjected to train line pressure on its lower side and to spring pressure on the upper side, which is vented to the atmosphere at 152, activates a vertically movable rod 154 carrying a laterally disposed latch 156 which is movable in a vertical path intersecting the path of horizontal travel of a lateral shoulder 158 of lug 102 on shaft 42.

In one embodiment of the invention, the spring is designed and adjusted to exert a pressure of 10 pounds when expanded, and when compressed, a pressure of 30 pounds, whereby as soon as the train line pressure drops under 30 pounds, as by an emergency brake application, the latch 156 is lowered into a position to engage lug 158 to block movement of shaft 42. The latch 156 is so positioned that it will not be passed by lug 158 in its travel to the left until 15 seconds have passed.

Attention is now directed to the slow leak timer, indicated generally at 34 in Figures 1 and 2 and shown specifically in Figure 4. This mechanism is similar to that shown in Figure 3, consisting of a base member 160, passages 162 controlled by a check valve 164 secured as at 166. Cover members 168 and 170, the latter provided with an atmospheric vent 172, together with metallic diaphragms 174, 176 are secured upon opposite sides of the doubly concaved member 160 as by bolts 178. A conduit 180 is in continuous communication with the branch pipe 38 and thus is exposed to the train line pressure of the brake pipe 12. The covers and diaphragm in cooperation with the base member 160, provide four collapsible fluid pressure chambers 182, 184, 186, 188. A by-pass extends between the central chambers 184 and 186 and consists of passages 190, 192, each connecting with a lateral bore 194 in the base member. A needle valve 196 is positioned to restrict the flow from passage 192 into the bore 194 and is spring biased as at 198 to open position. The opening movement is limited however, by flexible stop member 200 adjustably controlled by a screw 202 threaded in a closure plug 204 for the bore 194. The passages 190, 192, bore 194, needle valve 196 and screw 202 provide means for regulating the rate of flow between chambers 184 and 186 by way of the by-pass, it being understood that substantially instantaneous one-way flow is permitted from 184 to 186 by the passageway 162 and valve 164.

Diaphragm 176 is secured to a disc 206 attached to the end of the shaft 208, extending through a tubular boss 210 depending axially from the cover 170. A compression spring 212 is positioned between the disc 206 and a closure plug 214 secured by screw threads in the outer end of boss 210, the shaft 208 being slidable through a central aperture in the boss. The member 214 is adjustable to vary the compresssion of spring 212 and hence the range of operation of the device. As shown in Figures 2 and 9, the shaft 208 terminates in a laterally extending latch or lug 216, which when the shaft is raised sufficiently, is disposed in the path of travel, as shown in dotted lines in Figure 9, of a stop member 218, extending laterally from a sleeve 220 which is adjustably secured in any desired manner upon shaft 42.

It is evident that considerable latitude for variations in the spring and fluid pressures exist in adapting the invention to various brake systems, the extent of these changes being a mere matter of design.

From the foregoing description the operation of the device will be now apparent. In the normal application of the service brakes to railway cars, the train line pressure is not normally reduced below the pressure of the spring 98, whereby the bleed valve mechanism will not be actuated. When the conductors or emergency brake is applied, the train line pressure immediately drops below the pressure of the spring 98 and the bleed valve mechanism starts to move to the left. However, the fast leak timer immediately lowers the latch 156 to block the movement of shaft 42 and thereby prevent the bleeding of the car reservoirs, If at any time the cars are on an unsafe incline, the means 36 prevents operation of the bleed mechanism. When it is desired to bleed these reservoirs, the train pressure of the train line is lowered to 35 pounds or just below the pressure produced by the adjustment of plug 96 on the spring 98, and held at this level for approximately 15 seconds, thus applying the service brakes and giving the shaft 42 sufficient time to travel to the left a distance great enough to clear the stops of the series of various safety devices except that of the inclination responsive means. If this latter device is not operative at the moment, by reason of the car being on a sufficiently level surface, the roller carried by shaft 42 engages the cam surface 100, opens the bleed valve to its maximum extent and thereby accelerates the leftward movement of shaft 42 and thereby substantially instantaneously opening the reservoir bleed valves. It will therefore be evident that the reservoirs may not be bled until the brakes have been applied for a period of substantially 15 to 17 seconds thereby giving ample time to the service brakes for stopping the train before the reservoirs are bled. It should be noted, that the shaft 208 and the latch 216, are moved toward the shaft 42 in response to a pressure within the slow leak timer 34 slightly greater than the pressure at which the shaft 42 operates in its leftward direction, for example forty pounds, so that under a gradual leak or slow leak condition, the latch 216 will move into locking abutment with the shoulder 220 before the shaft 42 has begun its leftward movement and thereby preventing the bleeding of the brake cylinders and reservoirs.

Upon a continued, gradual leak or slow leak, decreasing and approaching a pressure of ten pounds, or slightly below ten pounds, the latch 156 will lockingly abut stop member 218 since at such a pressure (10–0 pounds) the fast leak timer 32 is actuated.

When the operator desires to bleed the reservoirs, the pressure in the primary actuating member is reduced rapidly from above forty pounds to approximately thirty-five pounds and the shaft 42 moves leftward before the latch 216 can be actuated sufficiently to abut the stop 220.

I claim as my invention:

1. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a lever connected to said valve, pressure-responsive means connected to and operating said lever, and time-delay means controlling the rate of operation of said pressure-responsive means.

2. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a lever connected to said valve, pressure-responsive means connected to and operating said lever, and time-delay means controlling the rate of operation of said pressure-responsive means, and safety means, responsive to predetermined inclination thereof, for preventing opening of said bleed valve.

3. In an automatic fluid brake system for railways, wherein the service application of the brakes is controlled by selective variations, within a predetermined range, of the train line pressure, and having a car reservoir and a bleed valve therefor, in combination, actuating means for automatically opening after a prolonged and predetermined diminution of train line pressure below said predetermined range, said actuating means including a lever connected to said valve, pressure-responsive means connected to and operating said lever, and time-delay means controlling the rate of operation of said pressure-responsive means, and safety means responsive to a sudden reduction in train line pressure below said predetermined diminution for preventing opening of said bleed valve.

4. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a lever connected to said valve, pressure-responsive means connected to and operating said lever, and time-delay means controlling the rate of operation of said pressure-responsive means, and safety means responsive to a slow leak continuing below said predetermined range of train line pressure and effective within a predetermined time interval only, for preventing opening of said bleed valve.

5. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a lever connected to said valve, pressure-responsive means connected to and operating said lever, and time-delay means controlling the rate of operation of said pressure-responsive means, and safety means, responsive to predetermined inclination thereof, for preventing opening of said bleed valve, and safety means, responsive to a sudden reduction in train line pressure below said predetermined diminution for preventing opening of said bleed valve.

6. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a diaphragm exposed to train line pressure and connected to a sliding bar, adjustable spring means attached to and biasing said bar to bleed valve opening position and a time delay lost motion means connecting said bar to said bleed valve operating means.

7. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a diaphragm exposed to train line pressure and connected to a sliding bar, adjustable spring means attached to and biasing said bar to bleed valve opening position, a time delay lost motion means connecting said bar to said bleed valve operating means, and safety means responsive to predetermined inclination thereof, for preventing opening of said bleed valve.

8. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including a diaphragm exposed to train line pressure and connected to a sliding bar, adjustable spring means attached to and biasing said bar to bleed valve opening position, a time delay lost motion means connecting said bar to said bleed valve operating means, and safety means responsive to a sudden reduction in train line pressure below said predetermined diminution for preventing opening of said bleed valve.

9. In an automatic fluid brake system for railways, wherein the service application of the brakes is controlled by selective variations, within a predetermined range, of the train line pressure, and having a car reservoir and a bleed valve therefor, in combination, actuating means for automatically opening after in combination, actuating means for automatically opening after a predetermined time interval said bleed valve in response to a prolonged and predetermined diminution of train line pressure below said predetermined range, said actuating means including a diaphragm exposed to train line pressure and connected to a sliding bar, adjustable spring means attached to and biasing said bar to bleed valve opening position, a time delay lost motion means connecting said bar to said bleed valve operating means, said lost motion means including an elongated slot in said bleed valve operating means and a member carried by said bar received in and movable in said slot.

10. In an automatic fluid brake system for railways, wherein the service application of the brakes is controlled by selective variations, within a predetermined range, of the train line pressure, and having a car reservoir and a bleed valve therefor, in combination, actuating means including a diaphragm, pressure means variable in response to train line pressure biasing said diaphragm, for automatically opening after a predetermined time interval said bleed valve in response to a prolonged and predetermined diminution of train line pressure below said predetermined range, said predetermined time interval being effected by a pressure leak from said diaphragm, choke valve means controlling said pressure leak and means for regulating said choke valve means.

11. In an automatic fluid brake system for railways, wherein the service application of the brakes is controlled by selective variations, within a predetermined range, of the train line pressure, and having a car reservoir and a bleed valve therefor, in combination, actuating means including a diaphragm, pressure means variable in response to train line pressure biasing said diaphragm, for automatically opening after a predetermined time interval said bleed valve in response to a prolonged and predetermined diminution of train line pressure below said predetermined range, said predetermined time interval being effected by a pressure leak from said diaphragm, choke valve means controlling said pressure leak, means for regulating said choke valve means, and safety means, responsive to predetermined inclination thereof, for preventing opening of said bleed valve.

12. In an automatic fluid brake system for railways, wherein the service application of the brakes is controlled by selective variations, within a predetermined range, of the train line pressure, and having a car reservoir and a bleed valve therefor, in combination, actuating means including a diaphragm, pressure means variable in response to train line pressure biasing said diaphragm, for automatically opening after a predetermined time interval said bleed valve in response to a prolonged and predetermined diminution of train line pressure below said predetermined range, said predetermined time interval being effected by a pressure leak from said diaphragm, choke valve means controlling said pressure leak, means for regulating said choke valve means, and safety means responsive to a sudden reduction in train line pressure below said predetermined diminution for preventing opening of said bleed valve.

13. In an automatic fluid brake system for railways, wherein the service application of the brakes is controlled by selective variations, within a predetermined range, of the train line pressure, and having a car reservoir and a bleed valve therefor, in combination, actuating means including a diaphragm, pressure means variable in response to train line pressure biasing said diaphragm, for automatically opening after a predetermined time interval said bleed valve in response to a prolonged and predetermined diminution of train line pressure below said predetermined range, said predetermined time interval being effected by a pressure leak from said diaphragm, choke valve means controlling said pressure leak, means for regulating said choke valve means, and means operable after a predetermined travel of said bar for opening said choke valve to increase the rate of said pressure leak.

14. In an automatic fluid brake system for railways, wherein the service application of the brakes is controlled by selective variations, within a predetermined range, of the train line pressure, and having a car reservoir and a bleed valve therefor, in combination, actuating means including a diaphragm, pressure means variable in response to train line pressure biasing said diaphragm, for automatically opening after a predetermined time interval said bleed valve in response to a prolonged and predetermined diminution of train line pressure below said predetermined range, said predetermined time interval being effected by a pressure leak from said diaphragm, choke valve means controlling said pressure leak, means for regulating said choke valve means, lost motion means for effecting a predetermined extent of travel of said bar before acceleration of said bleed valve is effected.

15. In an automatic fluid brake system for railways, wherein the service application of the brakes is controlled by selective variations, within a predetermined range, of the train line pressure, and having a car reservoir and a bleed valve therefor, in combination, actuating means including a diaphragm, pressure means variable in response to train line pressure biasing said diaphragm, for automatically opening after a predetermined time interval said bleed valve in response to a prolonged and predetermined range, said predetermined time interval being effected by a pressure leak from said diaphragm, choke valve means controlling said pressure leak, means for regulating said choke valve means, lost motion means for effecting a predetermined extent of travel of said bar before acceleration of said bleed valve is effected, a plurality of stop members adjustably positioned longitudinally of said bar and a plurality of automatically operable stop means selectively cooperating with said stop members to limit movement of said sliding bar.

16. A bleed valve operating mechanism for the car reservoirs of an automatic fluid pressure brake system comprising means operatively connected to the bleed valve for regulating the latter, an operating member connected to said first named means, a spring biasing said member into its valve opening position, a pressure actuated member connected to said operating member, an actuating member subjected to fluctuating train line pressures, fluid pressure means connecting said actuating and actuated members, means for bleeding fluid from said fluid pressure means, a valve regulating the rate of bleeding by said means for bleeding fluid, said means for bleeding fluid controlling the time required for effecting bleeding of said car reservoirs.

17. The combination of claim 16 including means carried by said operating member for adjusting said regulating valve to increase the rate of bleeding after predetermined travel of said operating member.

18. The combination of claim 17 including a fast leak timer for preventing completion of the bleeding stroke of said operating member when the train line pressure reaches a predetermined minimum, said fast leak timer when operated being engageable with said last means prior to its adjusting actuation and incapable of engagement after its adjusting actuation.

19. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, said actuating means including an operating member connected to said valve, pressure responsive means connected to and controlling said member, and time delay means controlling the rate of operation of said pressure responsive means.

20. In an automatic fluid brake system for railways, wherein the service application of the brakes is controlled by selective variations, within a predetermined range, of the train line pressure, and having a car reservoir and a bleed valve therefor, in combination, actuating means for automatically opening after a predetermined time interval said bleed valve in response to a prolonged and predetermined diminution of train line pressure below said predetermined range, and safety means responsive to a sudden reduction in train line pressure below said predetermined diminution for preventing opening of said bleed valve, and further safety means responsive to a slow leak continuing below said predetermined range of train line pressure and effective within a predetermined time interval only, for preventing opening of said bleed valve.

ROBERT K. BIERY.

REFERENCES CITED

The following references are of record in the file of this patent:

UNITED STATES PATENTS

| Number | Name | Date |
|---|---|---|
| 1,672,731 | Quates | June 5, 1928 |
| 1,782,268 | Manning et al. | Nov. 18, 1930 |
| 2,123,164 | Bogut | July 12, 1938 |